Feb. 3. 1925.

W. F. FLEISCHER

SPRING CUSHIONING DEVICE FOR PISTONS

Filed Feb. 20, 1923

1,524,702

Inventor:
William F. Fleischer.
By Louis M. Schmidt.
Atty.

Patented Feb. 3, 1925.

1,524,702

UNITED STATES PATENT OFFICE.

WILLIAM F. FLEISCHER, OF NEW BRITAIN, CONNECTICUT.

SPRING-CUSHIONING DEVICE FOR PISTONS.

Application filed February 20, 1923. Serial No. 620,276.

*To all whom it may concern:*

Be it known that I, WILLIAM F. FLEISCHER, a citizen of the United States, residing at New Britain, in the county of Hartford and State of Connecticut, have invented certain new and useful Improvements in Spring-Cushioning Devices for Pistons, of which the following is a specification.

My invention relates to improvements in spring cushioning devices for pistons, having particular reference to the structure at and adjacent the wrist-pin, involving the cooperating bearings on the connecting-rod and in the piston, and the object of my improvement is to incorporate in said structure a pair of spring devices, operative substantially as spring washers and positioned one on each side of the connecting-rod bearing and opposed to the bearing-boss on the piston, so as to tend to oppose and resist relative sidewise movement of the connecting rod and the piston and thereby operate to cushion such movement, and resulting in overcoming and stopping such movement to a great extent and preventing the objectionable knocking that would take place without my improvement.

In the accompanying drawing:—

Figure 1:
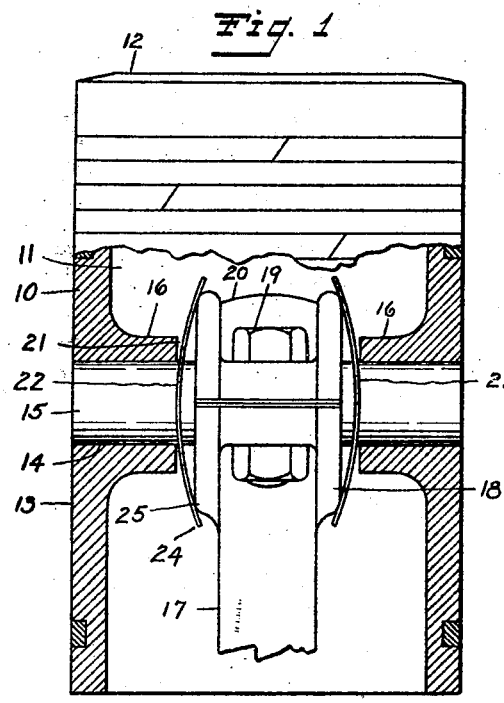
Figure 1 is a sectional view of a piston for a Ford automobile taken along the wrist-pin and showing the wrist-pin and the upper bearing end of the connecting-rod in side elevation, and also showing a pair of my improved spring-cushioning devices in place, mounted on the wrist-pin.
Figure 2:
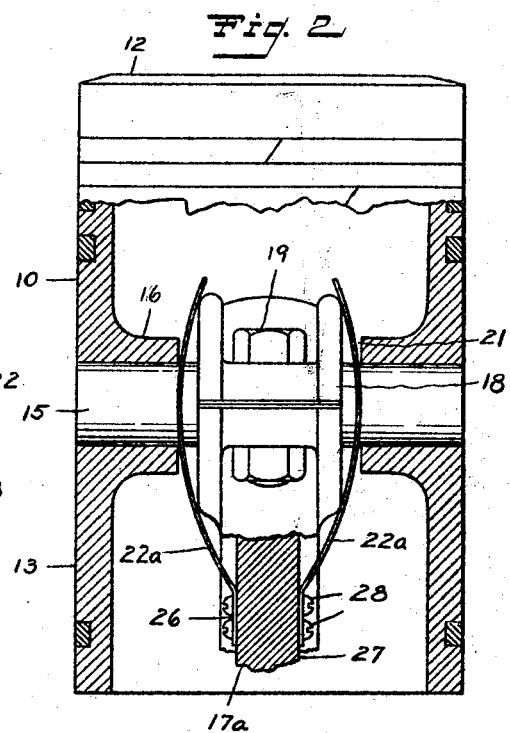
Figure 2 is a similar view showing a modified form of the spring-cushioning device.

My spring-cushioning device for pistons in the form shown is applied to the piston 10 of an internal-combustion engine as used in a Ford automobile, it being understood that with suitable changes as to details it would be applicable to other forms of engines.

The wall structure of the piston 10 encloses a generally cylindrical open space 11 that is closed at the upper end by the top wall 12. The side wall structure 13 is provided with a transverse opening 14 for the wrist-pin 15, the opening mentioned serving as a bearing therefor. That is to say, a divided bearing is provided for the wrist-pin, the two parts of said bearing serving to support the corresponding ends of the wrist-pin. In each case, the individual bearing-part is extended inwardly slightly into the space 11 by means of a boss 16.

The connecting-rod 17 extends upwardly into the space 11 and has at the upper end an enlarged bearing structure 18 that is divided and provided with a clamping or adjusting screw 19 adjacent the extreme upper end portion 20. Said upper bearing structure 18 is operatively mounted on the middle portion of the wrist-pin 15, being positioned between the two piston-bosses 16.

The width of the upper bearing structure 18 is appreciably less than the open space between the opposed bosses 16 so that there is clearance space 21 on each side between the parts mentioned and it is in said spaces 21 that my improved spring-cushioning devices 22 are positioned.

In the form shown in Fig. 1 said spring-cushioning devices 22 are virtually a spring washer, in each case, made of spring sheet metal and appreciably dished or curved.

The clearance spaces 21 may approximate one-sixteenth of an inch on each side of the connecting rod and in such spaces the material for the spring-cushioning devices 22 may have a thickness of twenty-two one-thousandths of an inch. The spaces shown in the drawing are exaggerated, the views being essentially diagrammatic.

The opening 23 is suitable for providing a loose mounting on the wrist-pin 15.

As shown, the convex sides are opposed to the bosses 16. Also, on the inner faces, the end portions 24 extend over and engage with the corners 25 of the upper bearing structure 18.

Figure 3:
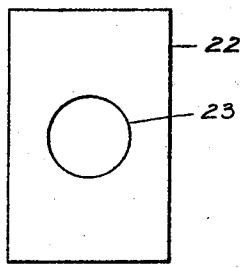
Figure 3 is a plan view of the blank for the spring-cushioning device shown in Fig. 1.
Figure 4:
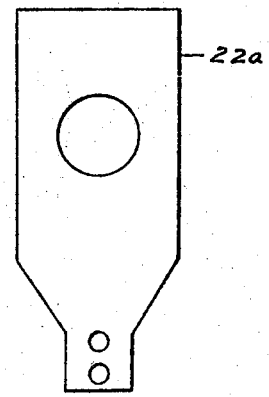
Figure 4 is a similar view of the spring-cushioning device shown in Fig. 2.

In the modified form shown in Figs. 3 and 4 the spring-cushioning device 22$^a$ is provided in each case with a downward extension 26 that extends along the body portion 27 of the piston connecting-rod 17$^a$. Said extension 26 is suitably perforated and is secured to the connecting-rod 17$^a$ by means of the screws 28.

In the modified form of construction the spring-cushioning devices and the connecting-rod are handled as a unit.

I claim as my invention:—

1. In combination in an internal-combustion engine, a piston having an open interior space, a connecting-rod extended into said space, a wrist-pin extending across said space with the connecting rod mounted on the middle thereof, the connecting-rod being separated from the opposed wall of the piston on each side by a separating space, and springs housed in said separating spaces, said springs being made of sheet metal, perforated for the wrist-pin, and of dished or curved form for contacting with the opposed parts on opposite sides of the separating space.

2. A spring for use in an internal combustion engine, positioned between the connecting rod and the opposed wall of the piston, said spring being of plate-like form, made of sheet metal, having a perforation for the wrist-pin, and being dished so as to maintain contact with the opposed parts under varying conditions of spacing of said parts one from the other.

WILLIAM F. FLEISCHER.